Figure 1:
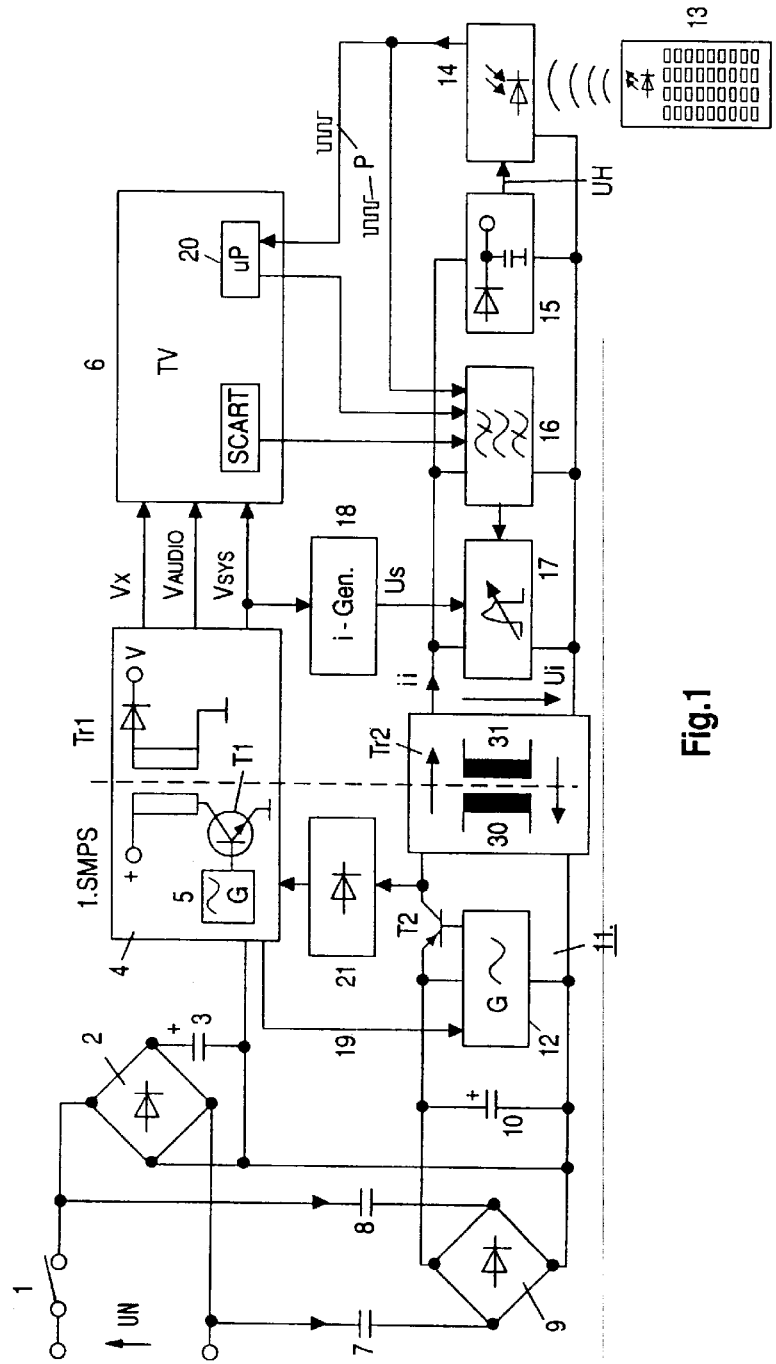

United States Patent [19]
Rehm et al.

[11] Patent Number: 5,949,660
[45] Date of Patent: Sep. 7, 1999

[54] SWITCHED-MODE POWER SUPPLY HAVING A STANDBY MODE

[75] Inventors: Markus Rehm; Thomas Riesle, both of Villingen-Schwenningen; Gërard Rilly, Unterkirnach; Jose-Ignacio Rodriguez-Duran, Villingen-Schwenningen, all of Germany

[73] Assignee: Deutsche Thomson-Brandt GmbH, Villigen-Schwennigen, Germany

[21] Appl. No.: 08/824,715

[22] Filed: Mar. 26, 1997

[30] Foreign Application Priority Data

Apr. 23, 1996 [DE] Germany .......................... 196 16 115

[51] Int. Cl.$^6$ .................................................. H02M 3/335
[52] U.S. Cl. .................................. 363/21; 363/16
[58] Field of Search .................. 363/16, 20, 21, 363/50, 56, 95, 97, 131

[56] References Cited

U.S. PATENT DOCUMENTS

| | | | |
|---|---|---|---|
| 4,499,530 | 2/1985 | Onda et al. ............................... | 363/17 |
| 4,876,636 | 10/1989 | Rilly et al. ............................... | 363/21 |
| 4,975,823 | 12/1990 | Rilly et al. ............................... | 363/56 |
| 5,508,903 | 4/1996 | Alexandrov .............................. | 363/16 |

FOREIGN PATENT DOCUMENTS

| | | | |
|---|---|---|---|
| 4237634 | 5/1994 | Germany | H04N 5/63 |
| 4331184 | 3/1995 | Germany | G01D 5/14 |
| 91/12649 | 8/1991 | WIPO | H02M 3/335 |

OTHER PUBLICATIONS

JP 6–113541A., In: Patents Abstracts of Japan, E–1583, Jul. 26, 1994, vol. 18, No. 397.

*Primary Examiner*—Matthew Nguyen
*Attorney, Agent, or Firm*—Joseph S. Tripoli; Joseph J. Laks; Sammy S. Henig

[57] ABSTRACT

In a switch-mode power supply, a transformer is used to transmit power during the forward-sweep time. The transformer is also used to transmit a control or regulating variable during the flyback time.

11 Claims, 3 Drawing Sheets

SWITCHED-MODE POWER SUPPLY HAVING A STANDBY MODE

The invention is based on a switched-mode power supply having a standby mode, according to the precharacterizing clause of claim 1. In the so-called standby mode,. also called operational readiness, specific stages such as the infrared receiver and a microprocessor on the secondary side of the switched-mode power supply, for example, must be active in order to be able to receive and evaluate infrared signals from a remote control transmitter. In the case of such a circuit, the microprocessor requires a power of about 750 mW. In order to reduce the power loss in the standby mode, it is known for it to be possible to switch the microprocessor off in the standby mode and, in addition to the active infrared receiver, to keep active only a passive search circuit having filter characteristics. The search circuit identifies only that signals are being received from a remote control transmitter, but cannot identify and evaluate the instruction contained in the signals. When such pulses are identified, the search circuit switches the microprocessor on, which can then identify the instruction contained in the infrared signals and can select the corresponding equipment function. Using such circuits, the power in the standby mode can be reduced to about 0.1 W.

Such a low power can no longer be transmitted correctly by the switched-mode power supply since the period for which the switching transistor is switched on is then too short and the efficiency of the switched-mode power supply is too low. It is thus known for a second transformer to be provided, separately from the switched-mode power supply, for transmitting the small amount of power in the standby mode.

In addition, in the case of a switched-mode power supply, information must be transmitted from the secondary side to the primary side. This comprises, for example, control instructions for switching over to various operating modes such as the standby mode, search mode, and normal mode. Since the DC isolation between the primary side and the secondary side must be maintained, a further transmission element with DC isolation is required for this purpose, such as an optocoupler or a transformer, for example.

The invention is based on the object of reducing the circuit complexity for transmitting the power from the primary side to the secondary side in the standby mode and for transmitting control or regulating variables from the secondary side to the primary side.

This object is achieved by the invention specified in claim 1. Advantageous developments of the invention are specified in the subclaims.

Thus, according to the invention, the second transformer is used for transmitting power from the primary side to the secondary side during the forward-sweep time, and for transmitting a control or regulating variable from the secondary side to the primary side during the flyback time.

The invention is based on the following knowledge: an isolating transformer which is operating as a forward converter has three phases during one operating period. During the first phase, the so-called forward-sweep time, the switching transistor is switched on and the power is passed through the transformer and the rectifier circuit to the charge-storage capacitor on the secondary side. During the second phase, the so-called flyback time, the switching transistor on the primary side and the rectifier circuit on the secondary side are switched off. However, the magnetization current from the forward-sweep time in the transformer must be reduced. The amplitude of the pulsed voltage depends on the amplitude of the demagnetization current, that is to say changing the demagnetization current on the secondary side changes the pulsed voltage on the primary side. The third phase, the so-called rest time, is the time after the demagnetization of the transformer until the switching transistor is switched on again. The invention now makes use of the fact that the forward-sweep time and the flyback time can be used for transmitting different variables, since these times are always unambiguously defined, and can be controlled and evaluated separately from one another, as a result of the pulse response on the transformer. The said second small transformer is thus used in an advantageous manner for transmitting power in the standby mode in one direction during the forward-sweep time, and is used for transmitting control or regulating variables in the other direction during the flyback time. Thus, no more than two components are required for transmitting power from the primary to the secondary on the one hand and for transmitting control or regulating variables from the secondary to the primary on the other hand. The circuit according to the invention makes possible a standby power of only about 0.1 W or less, depending on the application. Nevertheless, the second transformer can be implemented with a volume of, for example 5 cm$^3$ while complying with all the requirements for withstand voltage.

The control variable which is transmitted via the second transformer is preferably used on the primary side of the transformer to switch the power supply over between various operating modes such as the standby mode, search mode, and normal mode. This is achieved by the pulsed voltage having a different amplitude during the flyback time. In the normal mode, a regulating variable is transmitted, preferably via the second transformer, in order to control the period for which the switching transistor is switched on, for the purpose of stabilizing the operating voltages which are produced on the secondary side.

The secondary side preferably contains a manipulator or modulator by means of which the flyback pulse is amplitude-modulated at the second transformer by means of the control or regulating variable. The primary side accordingly contains a circuit which evaluates the amplitude of the flyback pulse at the second transformer and uses this to produce the control or regulating variable.

The secondary side of the second transformer preferably contains an auxiliary supply circuit which produces an operating voltage for the remote control receiver by rectifying the pulse on the secondary winding of the second transformer during the forward-sweep time. The secondary side contains a frequency-selective search circuit which is active in the standby mode and which, on identification of pulses from a remote control transmitter, switches on a microprocessor which is arranged on the secondary side and then evaluates the instruction which is contained in the pulses and initiates the appropriate switching, control or tuning function.

The secondary side-preferably contains a control circuit which is controlled by an operating voltage produced by the first switched-mode power supply and, if there is any deviation in this operating voltage, influences the amplitude of the flyback pulse via the said modulator, for the purpose of stabilizing the operating voltage.

The second transformer is preferably a component of a second switched-mode power supply, which is small in comparison with the first switched-mode power supply. The second switched-mode power supply contains an oscillator which is free-running in the standby mode and is synchronized by the first switched-mode power supply in the normal mode. This synchronization ensures that the control loop operates in a stable manner. The second switched-mode power supply causes the first switched-mode power supply to be switched off in the standby mode.

Figure 2:
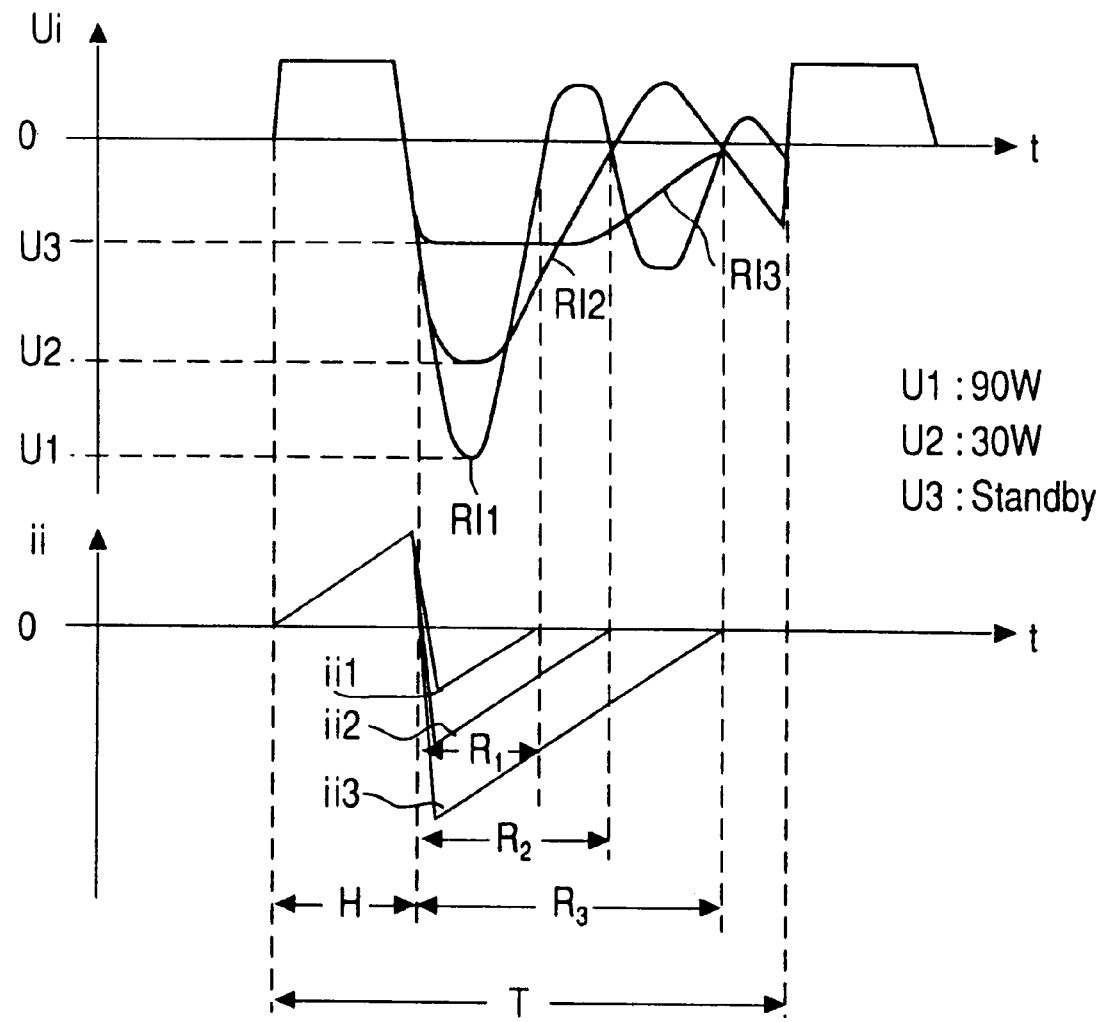
Figure 3:
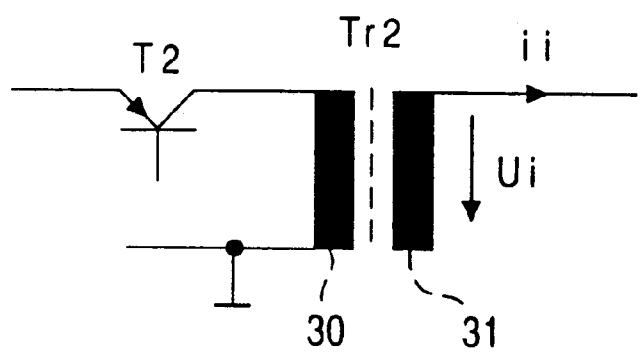
Figure 4:
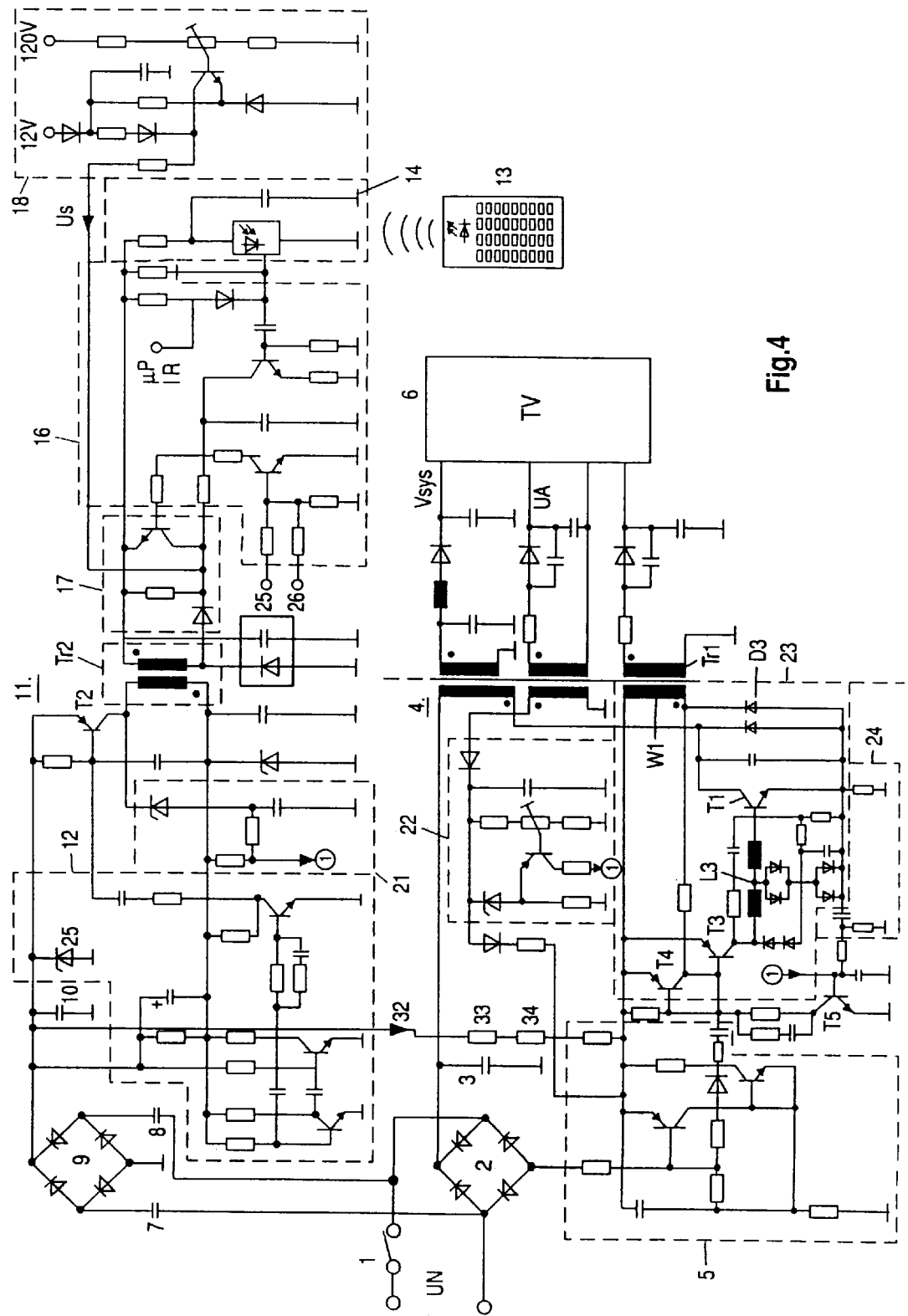

The invention is explained in the following text with reference to the drawing, in which:

FIG. 1 shows a block diagram of the switched-mode power supply designed according to the invention, FIG. 2 shows voltage and current waveforms during the forward-sweep time and the flyback time on the second transformer, FIG. 3 shows an equivalent circuit for the second transformer, and FIG. 4 shows a practically tested exemplary embodiment of the switched-mode power supply according to FIG. 1.

The symbols which are used in the following description and in the figures have the following meanings in this case:
H Forward-sweep time
ii Current in the secondary winding of the second transformer
N Power drawn from the mains and transmitted by the switched-mode power supply
P Pulses transmitted from a remote control transmitter
R1 Flyback time in the normal mode
R2 Flyback time in the search mode
R3 Flyback time in the standby mode
Ri Flyback pulse at the second transformer
T operating period of the second transformer
T-H-R Rest time
U1 Amplitude of the flyback pulse RI1 in the normal mode
U2 Amplitude of the flyback pulse RI2 in the search mode
U3 Amplitude of the flyback pulse RI3 in the standby mode
Ui Voltage on the secondary winding of the second transformer
Us Control variable for modulation of the amplitude of the flyback pulse at the second transformer
UH operating voltage for the infrared receiver FIG. 1 shows the mains voltage UN, the mains switch 1 and the first mains rectifier 2 with the charge-storage capacitor 3 for supplying the first switched-mode power supply 4, which contains, inter alia, the first transformer Tr1, the switching transistor T1 and the oscillator 5. The switched-mode power supply 4 produces operating voltages Vx, Vaudio and Vsys for the television receiver chassis 6. The mains voltage UN is also applied, via capacitors 7, 8 which are used for current limiting, to the second mains rectifier 9 which produces, on the charge-storage capacitor 10, an operating voltage for a second switched-mode power supply 11 which contains, inter alia, the control oscillator 12, the switching transistor T2 and the transformer Tr2. The infrared receiver 14 which is controlled by the remote control transmitter 13, the auxiliary supply circuit 15, the search circuit 16, the flyback modulator 17 and the regulation voltage generator 18 are provided on the secondary side of the second transformer Tr2.

The object and function of the individual stages illustrated are explained in the following text.

The control oscillator 12 determines the switching frequency of the second switched-mode power supply 11, which is about 90 kHz. The oscillator 12 is free-running in the standby mode. In the normal mode, the control oscillator 12 is synchronized by the first switched-mode power supply 4 via the line 19, in order to ensure a stable control loop.

During the forward-switching time H (FIG. 2) in the operating period T, the transformer Tr2 transmits a power level of about 5 mW to the secondary side, as the power supply for the infrared receiver 14. During the flyback time R, the transformer Tr2 transmits control and regulating variables from the secondary side to the primary side, as will be described in more detail in the following text. The auxiliary supply circuit 15 produces an operating voltage UH during the forward-sweep time H by rectifying the pulsed voltage Ui on the secondary winding 31 of the transformer Tr2, which operating voltage UH is supplied to the infrared receiver 14. The infrared receiver 14 receives control instructions from the remote control transmitter 13 and then supplies pulses P to the search circuit 16 and to the microprocessor 20 which is contained in the television receiver chassis 6. The search circuit 16 is designed as a passive filter which is tuned to the frequency of the pulses P and does not require an operating voltage. The filter effect suppresses noise signals from the remote control transmitter 13. The search circuit 16 records the occurrence of pulses P, but cannot identify the control instruction contained in them. As soon as pulses P are identified, the microprocessor 20 is switched on, and then evaluates the instruction which is contained in the pulses P and initiates an appropriate control function.

The generator 18 evaluates the operating voltage Vsys produced by the switched-mode power supply 4 and produces, at its output, a control variable Us relating to the deviation of the operating voltage Vsys from its nominal value. This control variable Us controls the amplitude of the pulse Ui at the transformer Tr2 during the flyback time R, such that the period for which the switching transistor T1 is switched on is controlled on the primary side, for the purpose of stabilizing Vsys.

The flyback modulator 17 influences the amplitude of the flyback pulse RI in the pulsed voltage Ui on the secondary winding 31 and thus also on the primary winding 30 of the transformer Tr2, corresponding to the control or regulating variable supplied to it.

The operating mode detector 21 on the primary side of Tr2 evaluates the amplitude of the flyback pulse RI on the primary winding 30 of the transformer Tr2, that is to say either RI1, RI2 or RI3, and accordingly causes the selection of a specific operating mode, which is predetermined by the flyback modulator 17, or regulation of the period for which the transistor T1 is switched on.

The various operating modes of the switched-mode power supply for supplying the television receiver chassis 6 will be explained successively in the following text.

Off state

By opening the mains switch 1, the switched-mode power supply is completely isolated from the mains. Thus, no power is drawn from the mains and no operating voltage is produced. In this state, the remote control transmitter 13 cannot be used to switch the television receiver on.

Standby mode

The mains switch 1 is now closed. A power of about 0.1 watts passes via the capacitors 7, 8 to the rectifier 9, which produces an operating voltage for the second switched-mode power supply 11, including the control oscillator 12. The control oscillator 12 is now free-running at a frequency of about 90 kHz. The transformer Tr2 transmits a power of about 5 mW. An operating voltage UH for the remote control receiver 14 is produced in the auxiliary supply circuit 15 from the pulsed voltage on the secondary winding 31 of the transformer Tr2 during the forward-sweep time H, so that the remote control receiver 14 is now ready to receive. The remote control transmitter 13 has not been operated, so that the remote control receiver 14 does not initially supply any pulses P. The search circuit 16 likewise thus does not receive any pulses P and in consequence modulates the amplitude of the flyback pulse RI3 on the transformer Tr2 to the value U3.

This value is detected in the operating mode detector 21 on the primary side. The operating mode detector 21 supplies to the first switched-mode power supply 4 a control variable which keeps the switching transistor T1 switched off and thus switches the first switched-mode power supply 4 off completely. The entire power consumption from the mains is about 0.1 watts, to be precise essentially for the active stages 12, 21, 15, 14.

Search mode

When the remote control transmitter 13 is operated, the remote control receiver 14 supplies pulses P to the search circuit 16 and to the microprocessor 20. The search circuit 16 now identifies the occurrence of the pulses P, without being able to identify the instruction contained in the pulses P. Via the flyback modulator 17, the search circuit 16 modulates the amplitude of the flyback pulse RI2 on the transformer Tr2 to the voltage value U2. The operating mode detector 21 detects this new voltage value U2 of the flyback pulse RI2 and supplies to the switched-mode power supply 4 a voltage which starts the switching operation of the switching transistor T1 and, in consequence, switches the switched-mode power supply 4, to transmit a power of about 5 watts. In consequence, the microprocessor 20 is supplied with operating voltage and can evaluate the instruction contained in the pulses P, for example "switch the television receiver to channel 3" or "switch the VCR to play-back". The microprocessor 20 then causes the television receiver to be switched on completely or switches the video recorder to the operating mode specified by the remote control transmitter 13, that is to say to select the normal mode in the function which is specified by the instruction defined by the remote control transmitter 13 by means of the pulses P. The mode of operation of the transformer Tr2 during the forward-sweep time H for producing the operating voltage UH on the secondary side at the same time remains unchanged.

Normal mode

As a result of the normal mode being selected by the microprocessor 20, the switched-mode power supply 4 now operates with full power transmission. The control oscillator 12 is now synchronized by the first switched-mode power supply 4, via the line 19. The control variable Us, which is dependent on the amplitude of Vsys, is obtained in the generator 18 from the output voltage Vsys of the switched-mode power supply 4. In the modulator 17, Us modulates the flyback pulse RI1 to the value U1. Changes in the amplitude of Vsys thus produce changes in the voltage U1 and are detected in the operating mode detector 21. The latter supplies to the first switched-mode power supply 4 a control variable which controls the period for which the switching transistor T1 is switched on, for the purpose of stabilizing the output voltages V of the switched-mode power supply 4. The control of the period for which the switching transistor T1 is switched on is in this case carried out, as a function of the magnitude of the operating voltage Vsys for stabilizing the output voltages V of the switched-mode power supply 4, as follows:

When the voltage Vsys falls, the control variable Us which is supplied from the generator 18 and is in the form of a control current becomes smaller. In consequence, the flyback pulse RI1 on the secondary winding 31 of the transformer Tr becomes smaller, that is to say the voltage U1 according to FIG. 2 falls. In consequence, the flyback pulse RI1 on the primary winding 30 of the transformer Tr2 becomes smaller. In consequence, the output voltage of the operating mode detector 21 in turn becomes smaller. As a result of this, this voltage increases the period for which the switching transistor T1 is switched on, and thus the final value of the collector current of the switching transistor T1. In consequence, the power transmitted via the transformer Tr1 is increased and thus compensates for the reduction in the operating voltage Vsys assumed initially.

Thus, control and regulating information items which differ from one another are transmitted from the secondary side to the primary side, via the transformer Tr2, during the flyback time R. This initially comprises the voltage U3 for selecting the standby mode, then the voltage U2 for selecting the search mode, and then the voltage U1 for regulating the switched-mode power supply 4 for the purpose of stabilizing the output voltages which are produced.

FIG. 3 shows the equivalent circuit of the second transformer Tr2.

FIG. 4 shows a practically tested circuit for the block diagram according to FIG. 1. In this case, the individual stages from FIG. 1 are each represented by a dashed outline, which is provided with the same reference number as in FIG. 1. The zener diode 25 is used for stabilizing the operating voltage for the second switched-mode power supply 11. The circuit link between the two switched-mode power supplies 4, 11 according to FIG. 1 is indicated by the fact that the power levels, which are marked with a (1), are linked to one another.

The following modules are also illustrated in addition to FIG. 1. The block 22 produces regulation on the primary side, that is to say stabilization of the output voltages of the switched-mode power supply 4. This block is not absolutely essential, because this regulation already takes place in the described manner via the switched-mode power supply 11.

The block 23 represents the detailed driver circuit for the switching transistor T1 as well as this switching transistor itself. The switch operation for the switching transistor T1 is maintained by positive feedback from the winding W1 of the transformer Tr1. The frequency is controlled by a control-clamping effect, which corresponds to the increase in the magnetization current during the phase when the switching transistor T1 is switched on. The amplitude at which the primary current through the winding W1 is switched off, and thus the measure of the stored energy, is controlled such that the output voltages V which are produced are stabilized. The frequency is subject to changes resulting from deviations in the magnetic characteristics of the core, in the load or in the applied operating voltage. The base current of the switching transistor T1 flows through the inductor L3, the transistor T3, the primary winding W1 and the diode D3. This base current is switched off by switching the transistor T4 on. The inductor L3 produces the negative base current as well as the voltage for the switching transistor T1. The transistor T4 is switched on when the transistor T5 is saturated. This control circuit is relatively simple and operates reliably in the defined manner. The base current of the switching transistor T1 in this case exhibits an ideal curve shape for switching the switching transistor T1 with losses which are as low as possible. This driver circuit for the switching transistor T1 is described in more detail in patent application No. 196 02 556. The line 32 and the resistors 33, 34 form a power supply for the starting oscillator 5.

The block 24 shows a collector current measuring circuit for the switching transistor T1, which circuit is used for limiting the current through the switching transistor T1, said current rising in a sawtooth shape during the forward-sweep time H.

So far, it has been assumed that switching on, that is to say switching over from the standby mode to the normal mode, is carried out by means of the remote control transmitter 13.

This switching on can likewise be carried out by a microprocessor or via a SCART cable via the terminals 25, 26.

We claim:

1. Switched-mode power supply having a standby mode, comprising:

an isolating transformer a switching transistor, which is switched on during the forward-sweep time and is switched off during the flyback time; and a second transformer for transmitting power from the primary side to the secondary side of the switched-mode power supply, during the forward-sweep time, and is used for transmitting a control or regulating variable from the secondary side to the primary side of the switched-mode power supply, during the flyback time.

2. Power supply according to claim 1, wherein the control variable is used on the primary side to switch the power supply over between various operating modes such as the standby mode, search mode, and normal mode.

3. Power supply according to claim 1, wherein in the normal mode, a regulating variable is transmitted in order to control the period for which the switching transistor is switched on, for the purpose of stabilizing the operating voltages which are produced on the secondary side.

4. Power supply according to claim 1, wherein the secondary side contains a modulator by means of which the flyback pulse is amplitude-modulated at the second transformer by means of the control or regulating variable.

5. Power supply according to claim 4, wherein the primary side contains a circuit which evaluates the amplitude of the flyback pulse at the second transformer and uses this to produce the control or regulating variable.

6. Power supply according to claim 1, wherein the secondary side contains an auxiliary supply circuit which produces an operating voltage for the remote control receiver by rectifying the pulsed voltage on the primary winding of the second transformer during the forward-sweep time.

7. Power supply according to claim 1, wherein the secondary side contains a frequency-selective search circuit which is active in the standby mode and which, on identification of pulses from a remote control transmitter, switches on a microprocessor which is arranged on the secondary side and then evaluates the instruction which is contained in the pulses and initiates an appropriate control or tuning function.

8. Power supply according to claim 4, wherein the secondary side contains a control circuit which is controlled by an operating voltage produced by the first switched-mode power supply and, if there is any deviation in this operating voltage, influences the amplitude of the flyback pulse via the modulator, for the purpose of stabilizing the operating voltage on the primary side.

9. Power supply according to claim 1, wherein the second transformer is a component of a second switched-mode power supply, which is small in comparison with the first switched-mode power supply.

10. Power supply according to claim 9, wherein the second switched-mode power supply contains an oscillator which is free-running in the standby mode and is synchronized by the first switched-mode power supply in the normal mode.

11. Power supply according to claim 9, wherein the second switched-mode power supply causes the first switched-mode power supply to be switched off in the standby mode.

* * * * *